US009214016B2

(12) United States Patent
Sacchi et al.

(10) Patent No.: US 9,214,016 B2
(45) Date of Patent: Dec. 15, 2015

(54) PANTOGRAPH MONITORING SYSTEM AND METHOD

(75) Inventors: Matteo Sacchi, Correggio (IT); Aurelio Piazzi, Castel S. Pietro Terme (IT); Stefano Cagnoni, Parma (IT); Luca Ascari, Parma (IT)

(73) Assignee: HENESIS S.R.L. (IT)

( * ) Notice: Subject to any disclaimer, the term of this patent is extended or adjusted under 35 U.S.C. 154(b) by 296 days.

(21) Appl. No.: 13/825,356

(22) PCT Filed: Sep. 21, 2011

(86) PCT No.: PCT/EP2011/066460
§ 371 (c)(1),
(2), (4) Date: Mar. 21, 2013

(87) PCT Pub. No.: WO2012/038485
PCT Pub. Date: Mar. 29, 2012

(65) Prior Publication Data
US 2013/0195321 A1    Aug. 1, 2013

(30) Foreign Application Priority Data
Sep. 22, 2010   (IT) .............................. MI2010A1721

(51) Int. Cl.
*G06K 9/00*   (2006.01)
*G06T 7/00*   (2006.01)
(52) U.S. Cl.
CPC ................. *G06T 7/00* (2013.01); *G06T 7/0004* (2013.01); *G06T 2207/30136* (2013.01)
(58) Field of Classification Search
None
See application file for complete search history.

(56) References Cited

U.S. PATENT DOCUMENTS

| 3,830,990 | A  | * | 8/1974  | Gray .............................. 191/55 |
| 6,408,105 | B1 |   | 6/2002  | Maruo |
| 7,739,208 | B2 | * | 6/2010  | George et al. ................... 706/16 |
| 2003/0223639 | A1 |   | 12/2003 | Shlain et al. |
| 2007/0272506 | A1 | * | 11/2007 | Herrmann et al. .............. 191/55 |
| 2009/0320554 | A1 | * | 12/2009 | Watabe et al. ...................... 73/7 |
| 2010/0322465 | A1 | * | 12/2010 | Wesche et al. ................ 382/100 |

(Continued)

FOREIGN PATENT DOCUMENTS
WO    2009018612 A1   2/2009

OTHER PUBLICATIONS

Moreno-Seco et al. "Comparison of Classifier Fusion Methods for Classification in Pattern Recognition Tasks," SSPR&SPR 2006, p. 705-713.*

(Continued)

*Primary Examiner* — Vu Le
*Assistant Examiner* — Samah Beg
(74) *Attorney, Agent, or Firm* — Cantor Colburn LLP

(57) ABSTRACT

A method for automatic diagnostics of images related to pantographs, comprising the steps of: capturing an image that shows a pantograph of a locomotive, the image being taken from an aerial view during the travel of the locomotive, the image comprising the gliding area of a plurality of slippers of the pantograph; identifying, by means of a module for classifying the pantograph model, the model of the pantograph within a plurality of pantograph models, on the basis of the image captured; determining, by means of a module for classifying materials, a material of which the slippers are composed among a plurality of materials, on the basis of the pantograph model identified; and determining a value related to the state of wear for each one of the plurality of slippers, on the basis of the type of material determined.

6 Claims, 13 Drawing Sheets

(56) References Cited

U.S. PATENT DOCUMENTS

2012/0013743 A1* 1/2012 Tanarro Marquez et al. . 348/148
2013/0202174 A1* 8/2013 Lee ............................... 382/131

OTHER PUBLICATIONS

Conners et al. "Identifying and Locating Surface Defects in Wood: Part of an Automated Lumber Processing System", IEEE 1983, p. 573-583.*

Cheng et al. "Color image segmentation: advances and prospects", Pattern Recognition 2001, p. 2259-2281.*

Bobier et al. "Content-Based Image Retrieval Using Hierarchical Temporal Memory", Proceedings of the 16th ACM international conference on Multimedia, 2008, p. 925-928.*

International Search Report for corresponding application PCT/EP2011/066460 filed Sep. 21, 2011; Mail date Oct. 28, 2011.

Leonard G. C. Hamey, "Pancam: In-Service Inspection of Locomotive Pantographs", Digital Image Computing Techniques and Applications, 2007. pp. 493-499, XP002638310.

Tomasz Kapuscinski, "Using Hierarchical Temporal Memory for Vision-Based Hand Shape Recognition under Large Variation in Hand Rotation" Artificial Intelligence and Soft Computing, col. 2, Jun. 13, 2010, pp. 272-279, XP002638644.

Zbigniew Oleksiak, "Computer Analysis of images worn surfaces", 2002, pp. 1-9, XP002638311, Internet URL : http://citeseerx.ist.puu.edu/viewdoc/summary.

Milan Sonka, "Image Processing Analysis and Machine Vision", Passage, Jan. 1, 1998, pp. 254-259, XP002357373.

Written Opinion for corresponding application PCT/EP2011/066460 filed Sep. 21, 2011; Mail date Oct. 28, 2011.

* cited by examiner

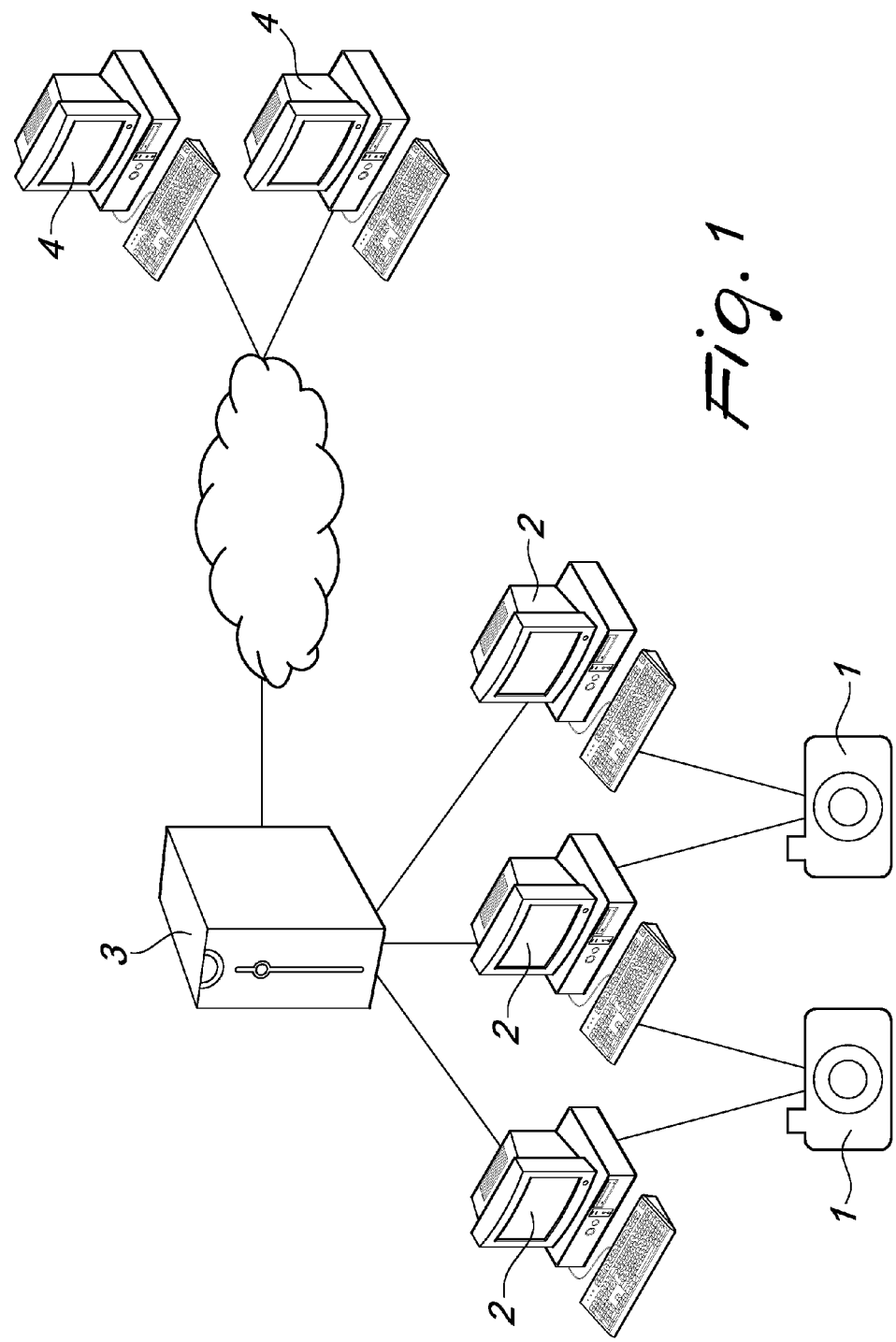

PANTOGRAPH MONITORING SYSTEM AND METHOD

TECHNICAL FIELD

The present invention relates to the field of image diagnostics and in particular relates to a system and a method for monitoring the state of wear of a pantograph.

BACKGROUND ART

As is known, rail haul vehicles that draw current from an overhead contact line generally use a device, known as pantograph, to connect the line to the vehicle.

A pantograph is constituted by an articulated system, known as frame, which is mounted by means of isolators on the roof of the rail vehicle, and by a bow provided with gliding elements which are in direct contact with the wire or wires of the electrical contact line.

The gliding elements are constituted by bars of conducting material, for example copper, steel, aluminum or carbon. These gliding elements are subjected continuously to wear due to the mechanical friction induced during gliding along the contact line.

For correct operation of locomotives, it is important to monitor the state of wear of the gliding elements, so as to be able to repair or replace them when they are worn or damaged. A damaged or worn pantograph in fact can cause such damage both to the locomotive and to the overhead electrical line as to render the railroad line unusable until repaired.

For this reason, a manual inspection of pantographs is usually performed at regular intervals; this type of inspection requires the electrical isolation of the lines and access to the roof of the cars to be inspected; it is, therefore, an expensive method that is inefficient in terms of personnel work and in terms of time for which the cars are inactive.

In order to obviate the drawbacks associated with manual inspection, systems for automatic detection of the state of wear of pantographs are known in the art.

In particular, systems are known which incorporate optical fibers next to the gliding elements of a pantograph. Optical signals are transmitted in these optical fibers so as to be able to detect, if the optical signal is lost, any damage to a fiber and consequently obtain an indication related to the damage or excessive wear of the gliding elements. Although these systems are rather accurate in signaling problems to pantographs, they suffer the drawback of being prohibitive in terms of production costs.

An alternative approach adopted in more recent years consists in providing automatic monitoring systems: in these systems, digital images of the pantographs, captured while the trains pass, are analyzed automatically to determine whether there is damage to the pantographs or excessive wear of the gliding material and to optionally generate alarm messages. These systems are convenient in terms of installation and maintenance costs, but in the background art they have not yet reached a sufficient level of accuracy as regards image analysis techniques, with the consequence that the generated alarm messages are not always reliable. Moreover, in general these systems allow inspection of the pantograph only in controlled environments, in which the train passes at a limited speed and typically require an image acquisition infrastructure that comprises, in addition to a still camera, a synchronization system in order to manage image taking simultaneously with the passing of the train and a lighting apparatus, with a consequent increase in the complexity and costs of this equipment.

DISCLOSURE OF THE INVENTION

The aim of the present invention is to devise a system and a method for monitoring pantographs that is capable of overcoming the problems of the background art described above.

Within this aim, an object of the invention is to provide a system and a method for monitoring pantographs that is based on automatic diagnostics of images of said pantographs.

Another object of the invention is to provide a system and a method capable of allowing video inspection and diagnostics even during the passing of a train in operation at normal speed.

Another object of the invention is to provide a system and a method that does not require a calibration process between the image acquisition apparatus and the analysis software.

Another object of the invention is to provide a system and a method that is able to simultaneously manage a plurality of image acquisition sites with different setup characteristics with no additional adaptation costs.

Another object of the invention is to provide a system and a method that are highly reliable, relatively easy to provide and at competitive costs.

This aim, as well as these and other objects that will become better apparent hereinafter, are achieved by a method according to claim 1.

BRIEF DESCRIPTION OF THE DRAWINGS

Further characteristics and advantages of the invention will become better apparent from the description of a preferred but not exclusive embodiment of the system and of the method according to the invention, illustrated by way of non-limiting example in the accompanying drawings, wherein:

FIG. 1 is a block diagram related to a possible architecture of the system according to the present invention;

WAYS OF CARRYING OUT THE INVENTION

Figure 2A:
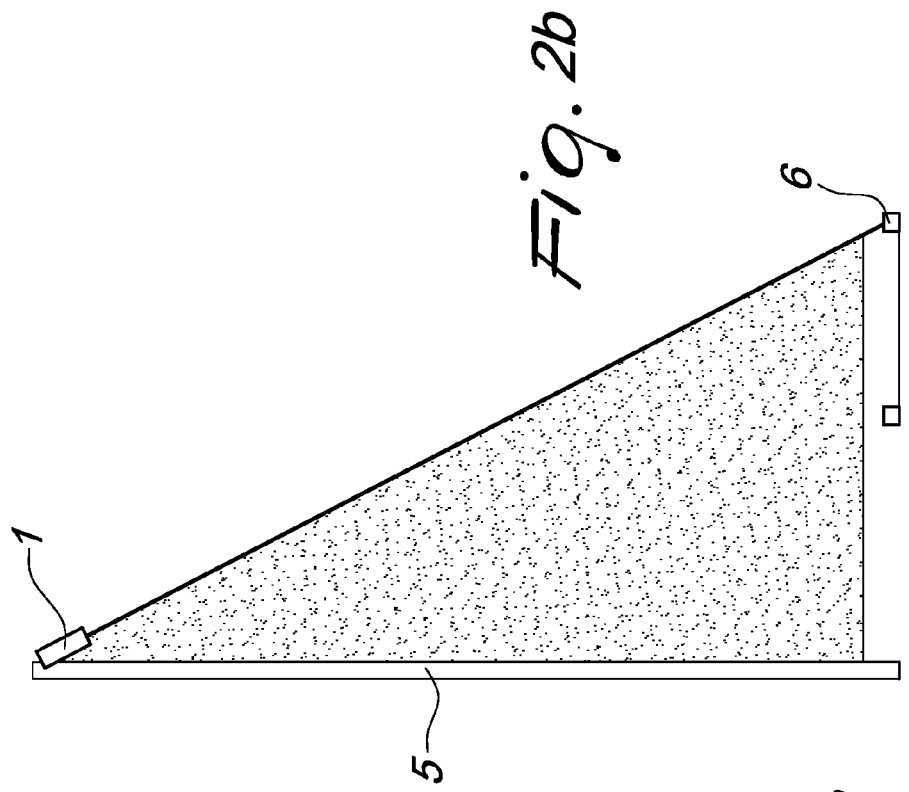
FIGS. 2a and 2b are respectively an aerial view and a front view of the methods of installation of an aspect of the architecture of FIG. 1.

An exemplifying architecture of the system according to the present invention is summarized in the block diagram of FIG. 1.

The figure comprises a plurality of still cameras 1, arranged along the electrical line, a plurality of work stations 2, which are connected to at least one still camera 1, a central computer 3, which is connected to the work stations 2, and a plurality of remote stations 4, which are connected to the central computer 3.

Figure 2B:
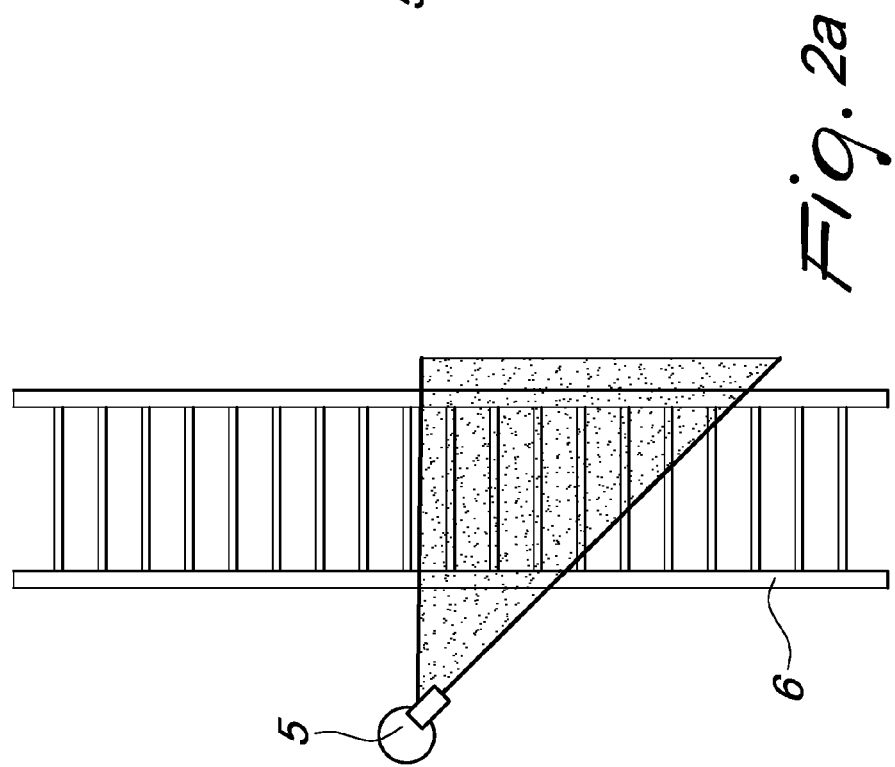

Each still camera is capable of capturing images related to the pantographs of passing trains and of sending the captured images to the user stations 2 by means of a wired or wireless link. In a preferred embodiment, each still camera is installed so as to be integral with a pole arranged along the railroad line according to the specifications illustrated in FIGS. 2a and 2b. FIGS. 2a and 2b are respectively an aerial view and a front view of a railroad line in which there is a track 6, a pole 5 arranged to the side of the track, and a still camera 1 installed on the pole. As is evident from the figures, the relative position of the still camera with respect to the track defines a first angle, known as pan angle, i.e., the angle comprised between the direction that is integral with the top of rail and the horizontal inclination of the still camera, and a second angle, known as tilt angle, i.e., the angle comprised between the vertical defined by the pole and the vertical inclination of the video camera. In a preferred embodiment, the pan angle is comprised between −20° and +20°, the tilt angle is comprised between 50° and 60°, and the magnification factor provided by the lens of the still camera with respect to the pantograph must be such that the ratio between the gliding area that is visible in the image and the total area thereof is greater than, or equal to, $2*10^{-2}$. It should be noted that the methods of installation of the still camera described above determine the capture of images of the pantographs according to an aerial view, not a front view.

Each work station 2 is a system of the client type, which is adapted to communicate with the central computer 3 by means of a wired or wireless link or by means of any data communications network adapted to implement a communications protocol of the client-server type.

The central computer 3 is typically a system of the server type, which is adapted to acquire data and serve processing requests that arrive from the work stations 2. The server preferably comprises a Web server and an interface of the Web type, which allow the server to interface with the remote stations 4, preferably by means of a data communications network such as the Internet or an intranet, in order to make available query and search functions.

Figure 3:
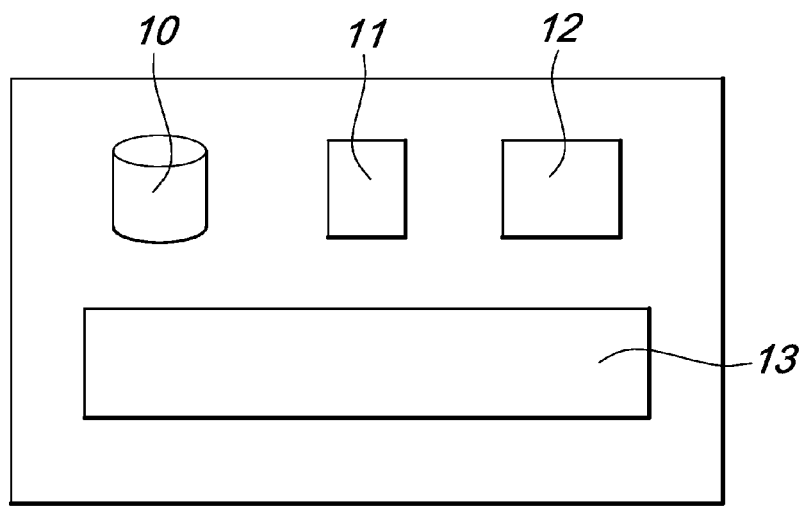
FIG. 3 is a block diagram that illustrates in greater detail an aspect of the architecture of FIG. 1.

FIG. 3 is a more detailed view of the architecture of the central computer 3 according to the invention of FIG. 1.

The central computer 3 according to the invention comprises storage means 10, a diagnostics environment 11, a module 12 for interfacing with the remote stations, and a module 13 for interfacing with the work stations.

The storage means 10 can comprise for example a database or any data structure adapted to store temporarily or permanently information related to the images captured by the still cameras and metadata associated with them, such as for example the number of the car to which the image refers or the date and time of acquisition of the image.

The diagnostics environment 11, which constitutes the inventive core of the present invention, comprises means for loading a collection of diagnostics modules stored in the storage means 10 and means for executing them in a coordinated manner, as will be described in greater detail hereinafter. In the preferred embodiment described here, this environment is hosted within the central computer 3 and is adapted to serve multiple work stations 2 simultaneously; in an alternative embodiment, the image diagnostics environment 11 is installed directly on each workstation 2.

The module 12 for interfacing with the remote stations is preferably an interface of the Web type, for example a Web portal, which allows access, display and searching of the information stored in the storage means 10 on the part of the remote stations 4, preferably following authentication.

The module 13 for interfacing with the work stations allows automatic communication between the work stations 2 and the image diagnostics environment 11. This interface module is intended to perform functions such as sending the images to be analyzed, requesting to perform diagnostics on a given image, searching among the images stored in the storage means 10 according to particular criteria, sending assessments regarding the results returned by the diagnostic functions as regards a given image.

In a preferred embodiment, communication between the computer 3 and the work stations 2 is based on Web services, exposed by the server 3 and consumed by the clients 2, according to methods that are known in the background art. The person skilled in the art appreciates without effort that it is also possible to adopt any infrastructure that allows communication among software components in a distributed environment, such as for example CORBA or DCOM.

With reference to the figures, operation of the system according to the invention is as follows.

The images acquired along the railroad line by a still camera 1 during the passage of a train are sent to a work station 2; the client installed on the work station 2, before submitting the image to the supervision of the operator able to report the images of damaged pantographs, sends the image to the central computer 3. Preferably, suitable metadata, i.e., information related to the image, such as for example the date and time when it was taken or the number of the train to which the image refers, are sent together with the image.

The central computer 3, once it has received the image, checks that the work station 2 from which it was sent has the necessary credential and authorizations for diagnostics, preferably adopting a public-private key certificate. The central computer 3 then stores the image and the metadata associated with it in the storage means 10. Then the central computer 3 activates the diagnostic environment 11, which, as will be described in greater detail hereinafter, performs automatic diagnostics of the pantograph contained in the image by using a set of artificial vision algorithms. In an exemplifying and non-limiting embodiment, during analysis the model of the pantograph that is present in the image, the type of material that is present on the gliding bars of the pantograph, the degree of wear of the gliding bars, the degree of perpendicularity of the contour of the pantograph with respect to the direction of motion of the locomotive, and possible impacts or mechanical damage to the end portions of the pantograph are assessed.

Once the diagnostic step has ended, the central computer 3 can work according to two different modes; in the first one, it returns to the work station 2 the result of said diagnostics. In a preferred embodiment, this result comprises an indication regarding the appropriateness of proposing the image for supervision on the part of an operator who is working at said work station. If the result reports the appropriateness of supervision, the image is displayed on a screen, and the operator, on the basis of its assessment, optionally alerts the train driver or the railroad company to replace or refurbish the pantograph.

In the second mode, the central computer 3 directly alerts the train driver or the railroad company that is responsible for the circulating train through data communications means, for example via SMS, MMS, e-mail, attaching the captured image when possible. The information related to the addresses to be contacted for the company responsible for the circulating train are contained in the storage means 10 and are generated during or after the installation of the system, while the information aimed at alerting the driver of the circulating train are acquired in real-time by interfacing the processing unit 3 with the circulation platform of the company that manages the railroad network, where available.

Figure 4:
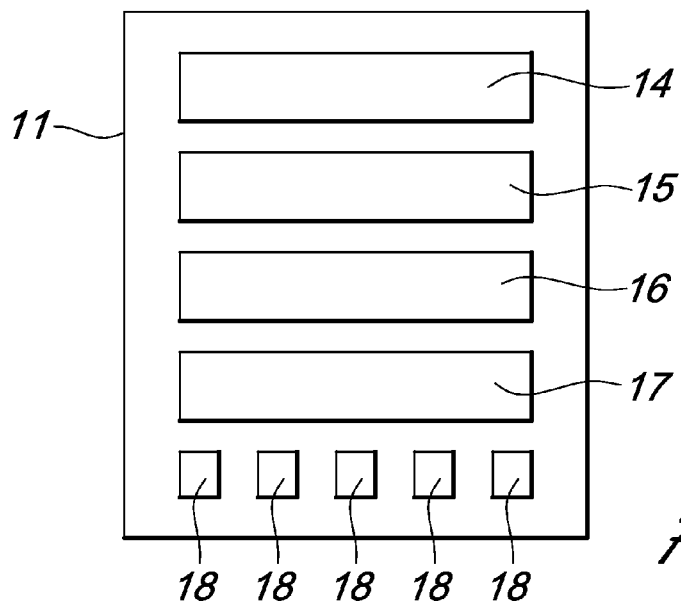
FIG. 4 is a block diagram that illustrates in greater detail another aspect of the architecture of FIG. 1.

FIG. 4 is a more detailed view of the architecture of the diagnostic environment according to the invention of FIG. 2.

The diagnostic environment 11 comprises a scheduling module 14, in a preferred embodiment a symbol registry 15, an initialization module 16, a logging module 17 and a plurality of diagnostics modules 18.

Each diagnostics module 18 is a software module that comprises an algorithm that is adapted to perform a specific diagnostic activity on a given image. In a preferred embodiment, the modules are loaded dynamically from the storage medium 10 into memory by the scheduling module 14, so that it is possible to set its enabling for execution in real time. According to this mode of operation, each diagnostics module defines a set of symbols required for its execution and a set of symbols produced by the module itself after its execution. Examples of symbols requested or returned by a module are the pantograph model, the type of material of which the slippers are made, or a particular intermediate step of the processing of an image or a portion thereof. For correct operation of the system, the order of execution of the diagnostics modules 18 must be consistent with the dependencies among the symbols in input to, and in output from, each module. The generation of an order of execution of the modules that is compatible with these dependencies is entrusted to the scheduling module 14.

The scheduling module 14 has the task of forming an execution schedule of the diagnostics modules 18, taking into account the dependencies among the modules induced by the respective expected and produced symbols. One possible embodiment of the method for loading the diagnostics modules into the schedule will be described in greater detail hereinafter with reference to FIG. 5.

Once the execution schedule has been established, before being able to execute each diagnostics module 18, an initialization step is required: the initialization module 16 is assigned to this and is designed to initialize the diagnostic environment for a particular image. Before the schedule of the diagnostics modules is executed, it is in fact necessary to initialize the environment with an image event identifier (UID) and an image acquisition site identifier (SID). Once these identifiers have been determined, the initialization module 16 loads from the storage means 10 the configuration settings of the image that were defined during calibration for the specific acquisition site, as will be described in greater detail with reference to FIG. 8. Moreover, the initialization module 16 loads the image to be processed from the storage means 10 into memory and adds the symbol related to the loaded image to the registry of symbols 15 of the diagnostic environment.

All the symbols produced by the diagnostics modules or loaded by default by the diagnostic environment after its initialization are saved in the symbol registry 15 of the diagnostic environment with reference to the preferred embodiment of a dynamic schedule. A reference to this registry is passed to the call for execution of the diagnostics modules 18; each module can read the symbols required for its own execution and can write the symbols that it produces.

Figure 6:
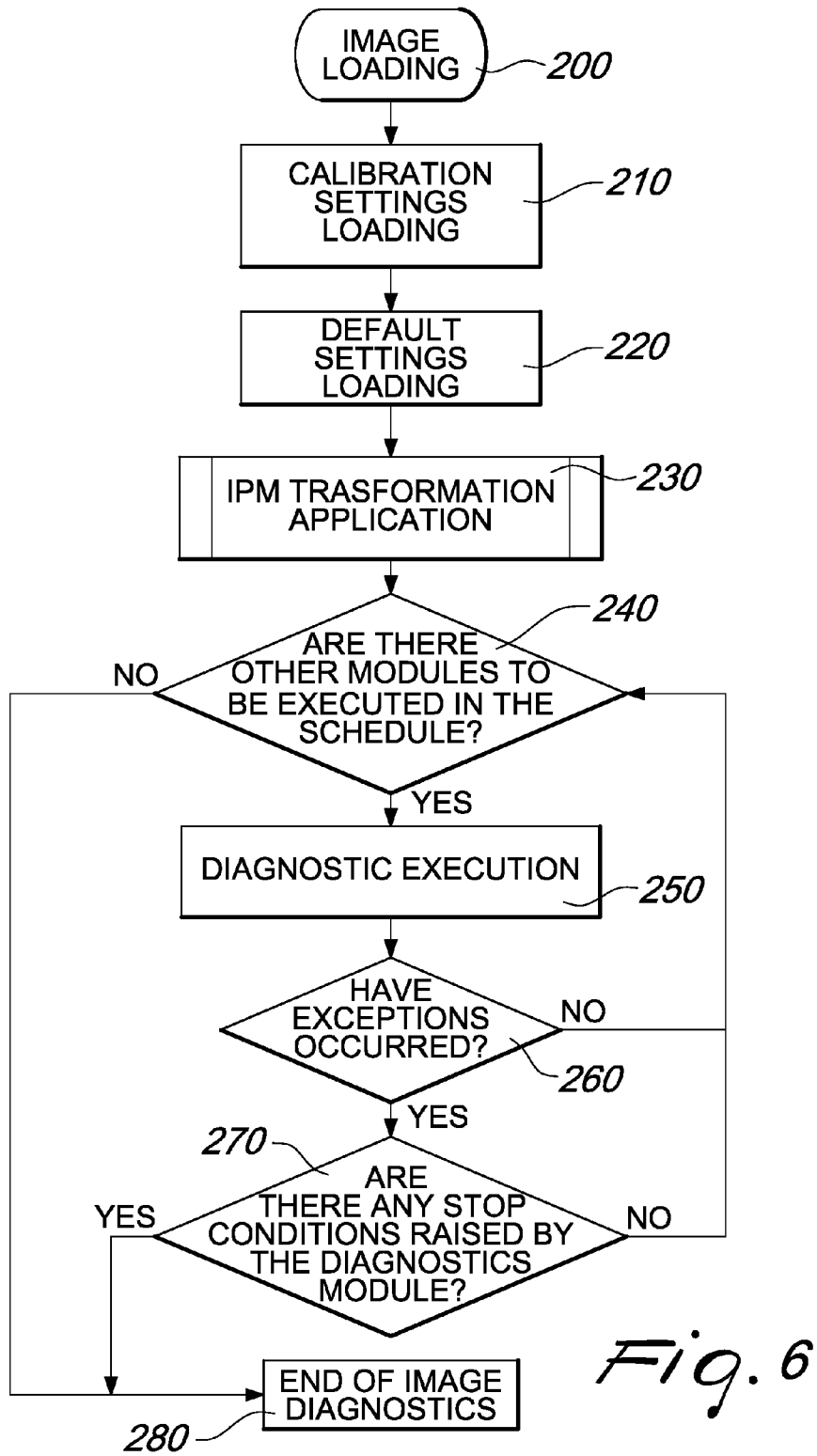
FIG. 6 is a flowchart of a possible embodiment of the method of execution of the diagnostics modules loaded in the execution schedule according to the present invention.

Once the schedule has been formed by the scheduling module 14 and once the diagnostic environment has been initialized for the processing of a new image on the part of the initialization module 16, the schedule is executed; in a preferred embodiment, this execution is implemented according to the method shown in FIG. 6.

During the execution of each module, the logging module 17, a system component which has the task of recording all the events that occur within the diagnostic environment 11, is active; it is capable of recording output strings to temporary images or files generated as an intermediate result of processing during diagnostics. The detail of the information or images saved by the logging module 17 can be defined in real time by means of the module 12 for interfacing with the remote stations.

Figure 5:
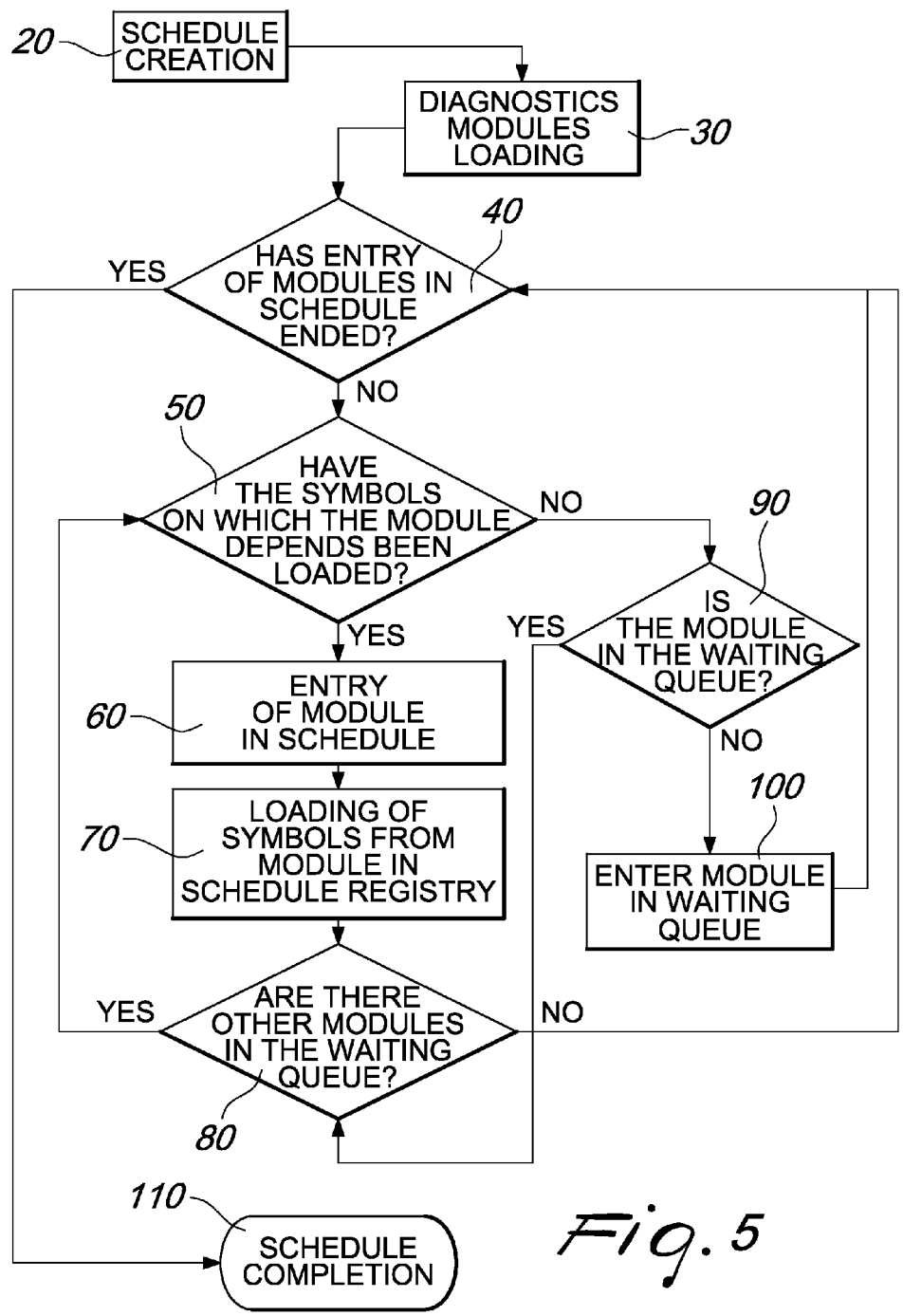
FIG. 5 is a flowchart of a possible embodiment of the method for loading the diagnostics modules in the execution schedule according to the present invention.

A possible embodiment of the method for loading the diagnostics modules into the schedule is now described with reference to FIG. 5.

Substantially, before adding a new module to the execution schedule, the scheduling module 14 checks that all its dependencies have been met. When this occurs, the module is added to the schedule and then analysis moves on to the next module. If the dependencies of the module are not met, it is inserted temporarily in a waiting queue, where it remains until all the other modules that meet its dependencies have been added to the execution schedule.

In detail, the method begins in step 20, in which the scheduling module 14 creates an execution schedule, i.e., a data structure that is adapted to contain an ordered list of the diagnostics modules 18; the schedule is initially empty. In step 30, the scheduling module 14 loads from the storage means 10 the diagnostics modules 18 and stores them in the diagnostics environment 11. In step 40, the scheduling module 14 assesses whether all the diagnostics modules have already been entered into the execution schedule: if so, control passes to step 110 and the method ends; if not, the scheduling module 14 considers one of the remaining diagnostics modules and in step 50 checks whether all the symbols required for the execution of said model have already been loaded into a registry that is internal to the scheduling module 14; if so, in step 60 said module is inserted in the execution schedule and in step 70 all the symbols produced by this module are added to the execution schedule, thus in step 80 analysis moves on to the next module, if present. If instead the check of step 50 yields a negative result, control passes to step 90, in which the scheduling module 14 checks whether the module is in a waiting queue: if it is not, in step 100 the module is added to the waiting queue and then control returns to step 40 for analysis of a new module. If in step 90 it is determined that the module was already in the waiting queue, the method moves on to step 80, which checks whether there are other modules in the waiting queue: if there are, the first module of the queue is analyzed, returning to step 50; if not, control returns to step 40 for analysis of any modules that have not yet been inserted in the execution schedule or in the waiting queue.

Once the execution schedule has been generated, the diagnostics modules are applied in sequence to a given image according to the order of precedence determined by the schedule itself. A possible embodiment of this mode of execution is now described with reference to FIG. 6.

Figure 8:
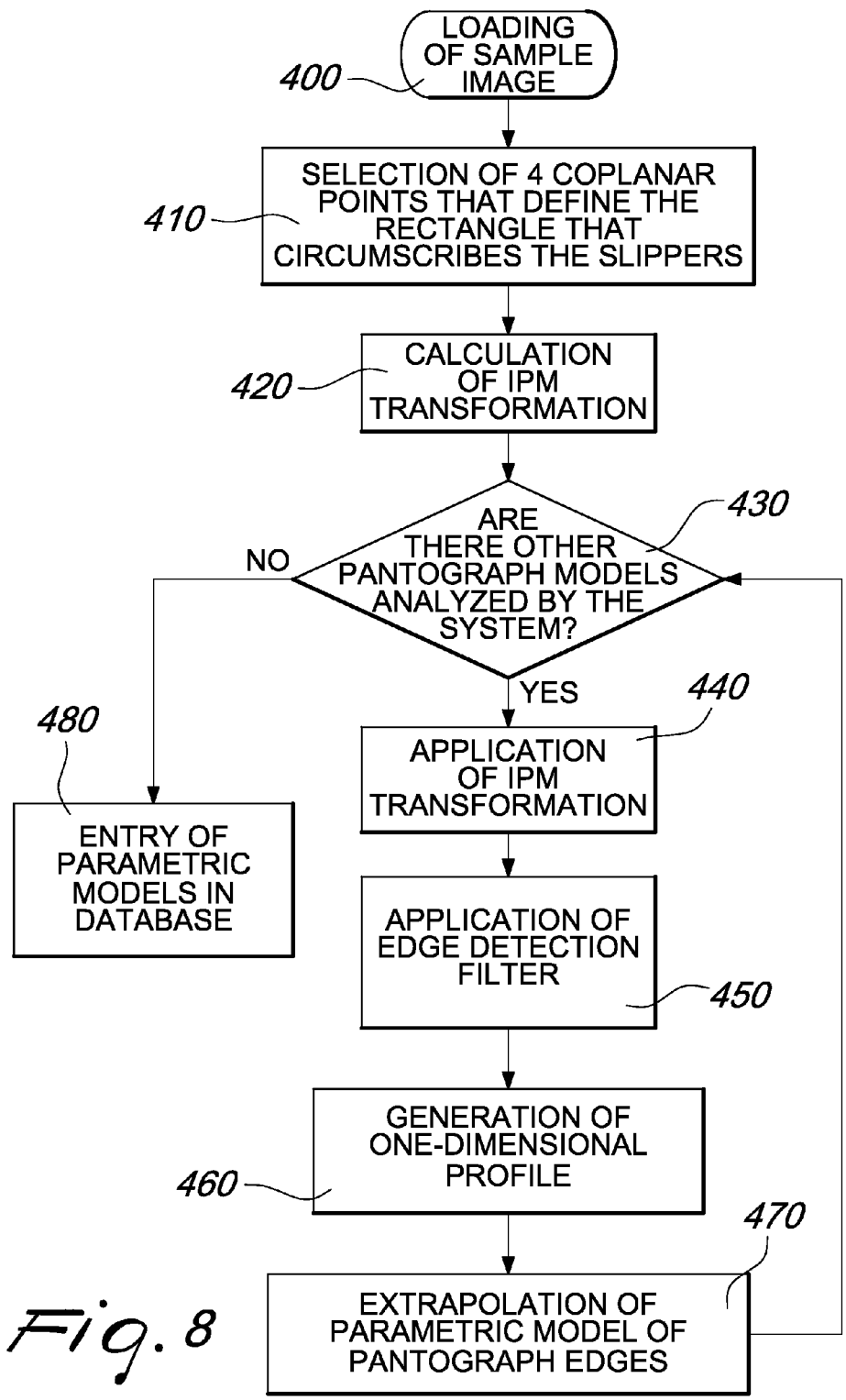
FIG. 8 is a flowchart of a possible embodiment of the method of calibration of a still camera according to the present invention.

The method begins in step 200, in which a given image and the metadata associated with it are loaded into the diagnostics environment; in particular, the acquisition site from which the current image originates is determined; on the basis of the analysis of step 200, in step 210 the calibration settings, i.e., settings that depend on the image acquisition site, are loaded from the storage means 10; these settings, which comprise for example a transformation matrix for removing perspective, are generated and stored during the step of calibration of each still camera, as will be described in greater detail hereinafter with reference to FIG. 8.

In step 220, the predefined settings of the system are loaded into the registry of the symbols 15 of the diagnostics environment 11; by way of example, these predefined settings comprise for example the model of the class of the pantograph extrapolated from the one-dimensional profile to calculate the correlation with the profile of the image acquired in real time, or the tolerances on the measurements. A pre-processing step then occurs in step 230, in which the image is subjected to an IPM (Inverse Perspective Mapping) transformation: as is known to the person skilled in the art, IPM is a geometric transformation that is intended to remove distortions produced in the image by perspective effects caused by the angle between the still camera and the subject of the image. This transformation allows to remove the perspective of the pantograph in the image, making it appears as seen from above. Advantageously, the application of the IPM transformation uses a specific transformation matrix for the frame generated by the still camera by which the image has been acquired; this matrix is calculated during the step of software calibration of the still camera and is then stored in the system to remove perspective from all future images that will be generated by the specific still camera, as will be described in greater detail with reference to FIG. 8.

Once the preprocessing step has ended, the method considers sequentially all the diagnostics modules loaded into the execution schedule; specifically, in step 240 the scheduling module 14 checks whether the schedule still contains modules to be executed: if it does not, the method ends in step 280; if it does, the first module of the schedule is considered and is executed in step 250. In step 260 a check related to any occurrence of exceptions during execution of the diagnostics module is performed and, if the result is positive, in step 270 these exceptions are analyzed to check whether they are stop conditions generated by the diagnostics module, and in this case the method ends in step 280. If instead no exceptions have occurred in step 260, or if these exceptions are not stop conditions for step 270, the diagnostics module performed previously is removed from the execution schedule and the method returns to step 240 for the execution of the next diagnostics module.

Figure 7:
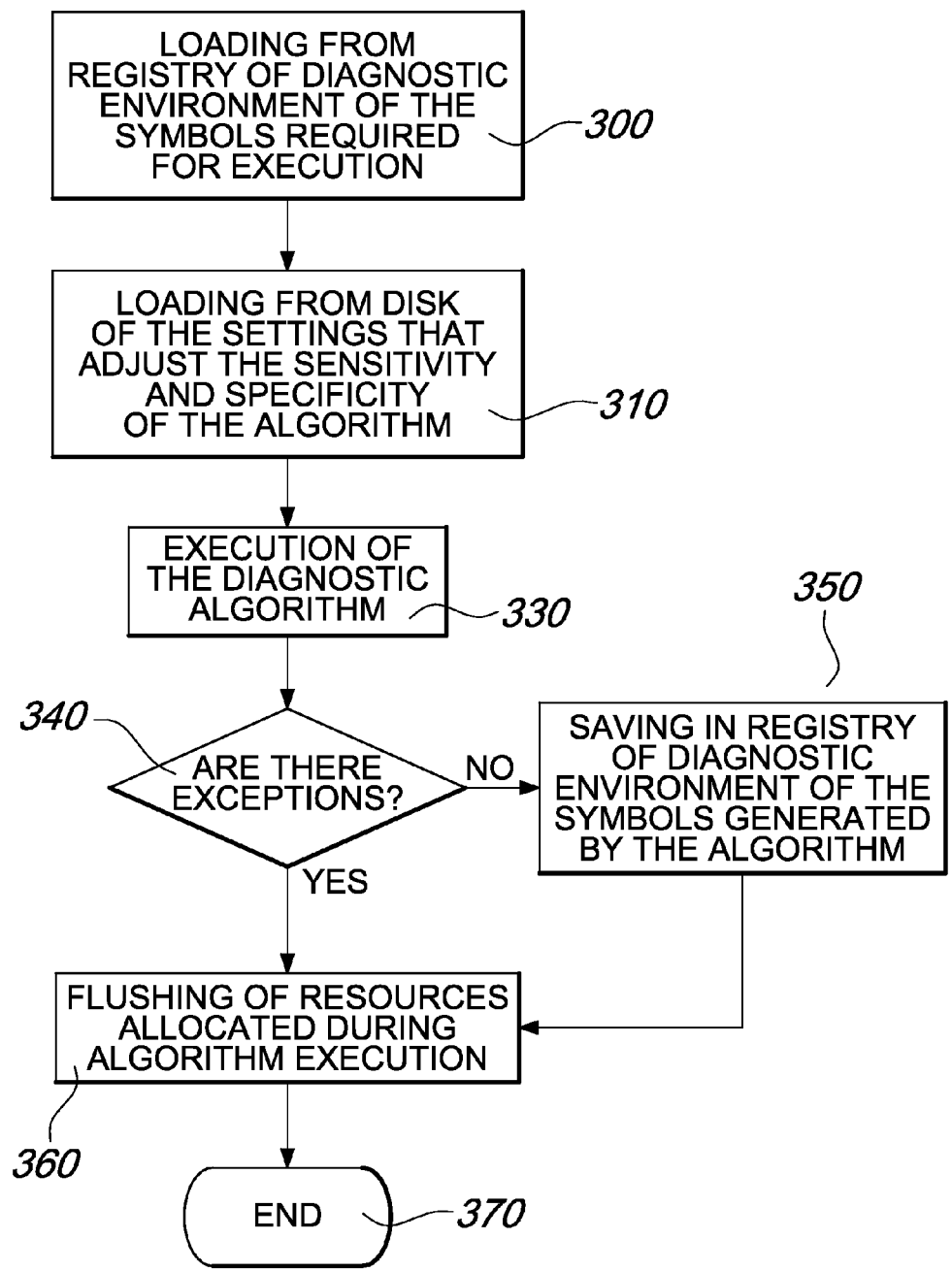
FIG. 7 is a flowchart of a possible embodiment of the method of execution of a diagnostics module according to the present invention.

FIG. 7 shows a possible embodiment of the step 250 of execution of a generic diagnostics module of the flowchart of FIG. 6.

The method begins in step 300, in which the diagnostics environment 11 loads from the symbol registry 15 all the symbols required for the execution of the diagnostics module 18. It should be noted that thanks to the method of generation of the execution schedule described previously, these symbols are assuredly present in the symbol registry 15. In step 310, the diagnostics environment accesses the storage means 10 to load a set of settings that adjust the sensitivity and specificity of the method implemented in the module: advantageously, these settings comprise parameters that are known in the background art for determining the optimum or pseudo-optimum setup of a classifying system, such as static thresholds, weights associated with the coefficients of a given equation, probabilities associated with different classes of analysis.

The diagnostics algorithm is then performed in step 330. At the end of execution, in step 340 the method checks whether exceptions have occurred: if they have not, in step 350 all the symbols generated by the algorithm are saved in the symbol registry 15 and then in step 360 the resources allocated during the execution of the algorithm are released and in step 370 the method ends. If the check of step 340 has a positive result, the step 350 is not executed and control passes directly to step 360.

The calibration settings of step 210 of FIG. 6 are loaded into the storage means 10 following a calibration procedure to be repeated for each still camera upon installation, which is now described with reference to FIG. 8.

The method begins in step 400, in which a sample image, generated by the specific still camera with respect to which one wishes to perform calibration, is loaded from the storage means 10. In step 410, in this image four coplanar points are selected which define the plane on which the slippers of the pantograph lie, known as top of rail. On the plane thus selected, in step 420 the IPM perspective transformation matrix on the sample image is calculated, as described previously, in order to correct any distortions caused by perspective effects; then a sequence of transformations is applied to the sample images related to the pantograph models stored beforehand in the storage means 10, repeating the sequence for each pantograph model: in particular, in step 440 the IPM transformation calculated in step 420 is applied to the current pantograph model, so as to obtain an aerial view in which the slippers appear as "two vertical strips"; in step 450, an edge detection filter, for example a Canny filter or a Sobel filter, is applied to the image thus obtained in order to extrapolate the vertical edges of the image; in step 460, by averaging on the columns of pixels of the image filtered in step 450, a one-dimensional profile of the image is generated which highlights peaks indeed at the "vertical strips" that correspond to the slippers; finally, in step 470 the profile generated in step 460 is used to extrapolate a parametric model of the pantograph model: in particular, the relative distances between the peaks of the profile constitute the parametric model that identifies the particular pantograph model for that specific still camera; this parametric model comprises, for example, values such as the thickness of the bars or the distances of the geometric elements of the pantograph.

Once the process of extrapolation of the parametric model has been repeated for each pantograph model, in step 480 the resulting values are stored in the storage means 10. These models can then be loaded into the diagnostics environment whenever it is necessary to process an image that originates from that specific acquisition site. In particular, they are used by the method for classification of the pantograph model of an image that originates from said site to calculate the degree of correlation between a similar profile extrapolated from the instance of the image being examined and the parametric models stored in the system, as will be described in greater detail with reference to FIG. 9.

With reference to FIGS. 9, 10, 11, 12 and 13, some possible diagnostics modules 18 of the diagnostics environment 11 are now described.

Figure 9:
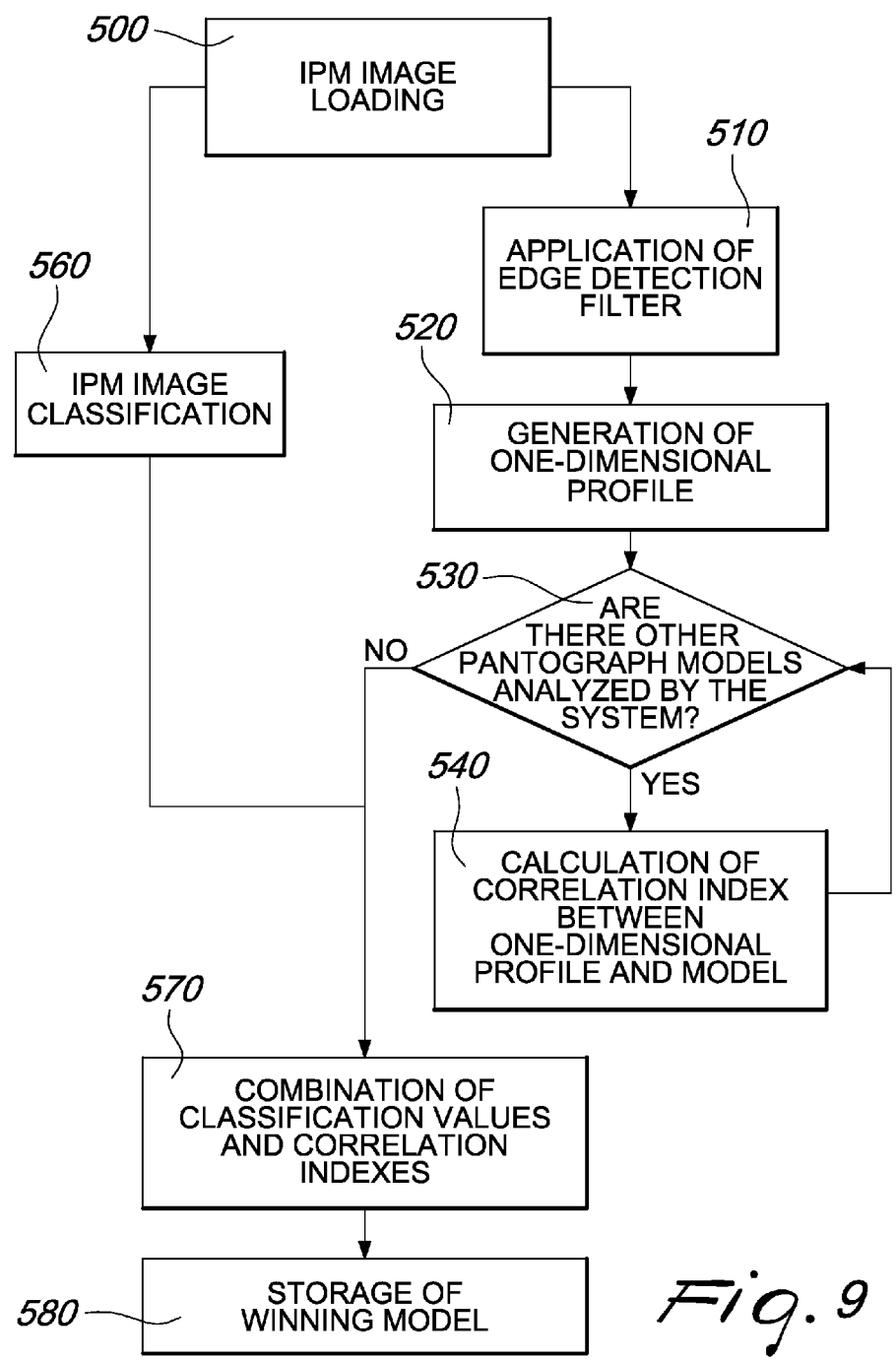
FIG. 9 is a flowchart of a possible embodiment of a method for classification of the pantograph model according to the present invention.

FIG. 9 is a flowchart that describes a method for recognizing the pantograph model reproduced in an image being examined. The method is based on the merging of two different approaches: the first one consists of a plurality of transformations on the image to calculate a profile function whose degree of correlation with each one of the models extrapolated during the initial calibration step is established, according to methods that are known in the art; the second approach consists in performing a classification of the IPM image with respect to the several pantograph models by means of a Memory Prediction Framework (MPF) method, such as an HTM (Hierarchical Temporal Memory) network and a classifying system known in the art, such as for example KNN or SVM. The correlation indexes generated with the two approaches are then merged and the algorithm returns as a pantograph model associated with the image the one that has the highest correlation index.

In detail, the method begins in step 500, which considers the IPM transformation applied in step 230 to the image to be classified and stored in the registry of symbols 15 of the diagnostics environment 11. The method then forks into two branches, in which two distinct classification methods are applied to the IPM image.

The first branch begins with step 510, in which an edge detection filter known in the art, for example a Canny filter or a Sobel filter, is applied to the IPM image in order to extrapolate the vertical edges of said image. In step 520, the IPM image thus filtered is used to calculate a one-dimensional profile on the basis of the average values obtained from the columns of pixels of said filtered IPM image. In step 530, all the pantograph models, and particularly the models of the edges of the pantographs obtained in the calibration step described in FIG. 8 (step 470), are considered. For each pantograph model, in step 540 an index of correlation between said model and the one-dimensional profile generated in step 520 is calculated.

The second branch of the method is constituted by the step 560, in which the IPM image is classified by means of a MPF based method optionally in combination with another meta-classifying system known in the art, for example SVM or KNN, in which the classes represent the several models of pantographs; the classification returns in output a plurality of floating-point values comprised between 0 and 1 for each class; these values define the probability of the pantograph in the image of belonging to the class of each model involved in the analysis.

In step 570, the results generated by the two branches of the method are combined, preferably by means of a weighted sum the weights of which can be changed in order to modify appropriately the sensitivity and specificity of the classification method, as described with reference to step 310. In this way, an index of correlation between the image being analyzed and each pantograph model is obtained. Finally, in step 580, the pantograph model with the highest correlation index is returned as output of the method and entered in the registry of symbols 15 of the diagnostics environment 11.

It should be noted that the method now described considers alternative embodiments in which respectively only the first branch or only the second branch of the method are executed.

It should be further noted that pantograph model classification methods known at state of the art allow for classification of the geometry of a pantograph distinguishing between a "Y" and a "T" shape. In contrast, the proposed method allows for the exact identification of the pantograph model even among models bearing a similar geometry.

The classification information of the pantograph model generated by the algorithm described with reference to FIG. 9 is used by the subsequent diagnostics modules, in particular by the module for classifying the degree of wear of the gliding slippers. In a preferred embodiment, said module is composed in turn of three modules: a module for extrapolating the IPM image of the area related to the gliding elements, a module for classifying the type of material of which the gliding elements are composed, and finally a module for classifying the wear on the basis of the results provided by the preceding two modules. A possible embodiment of the three modules is now described with reference to FIGS. 10, 11 and 12.

Figure 10:
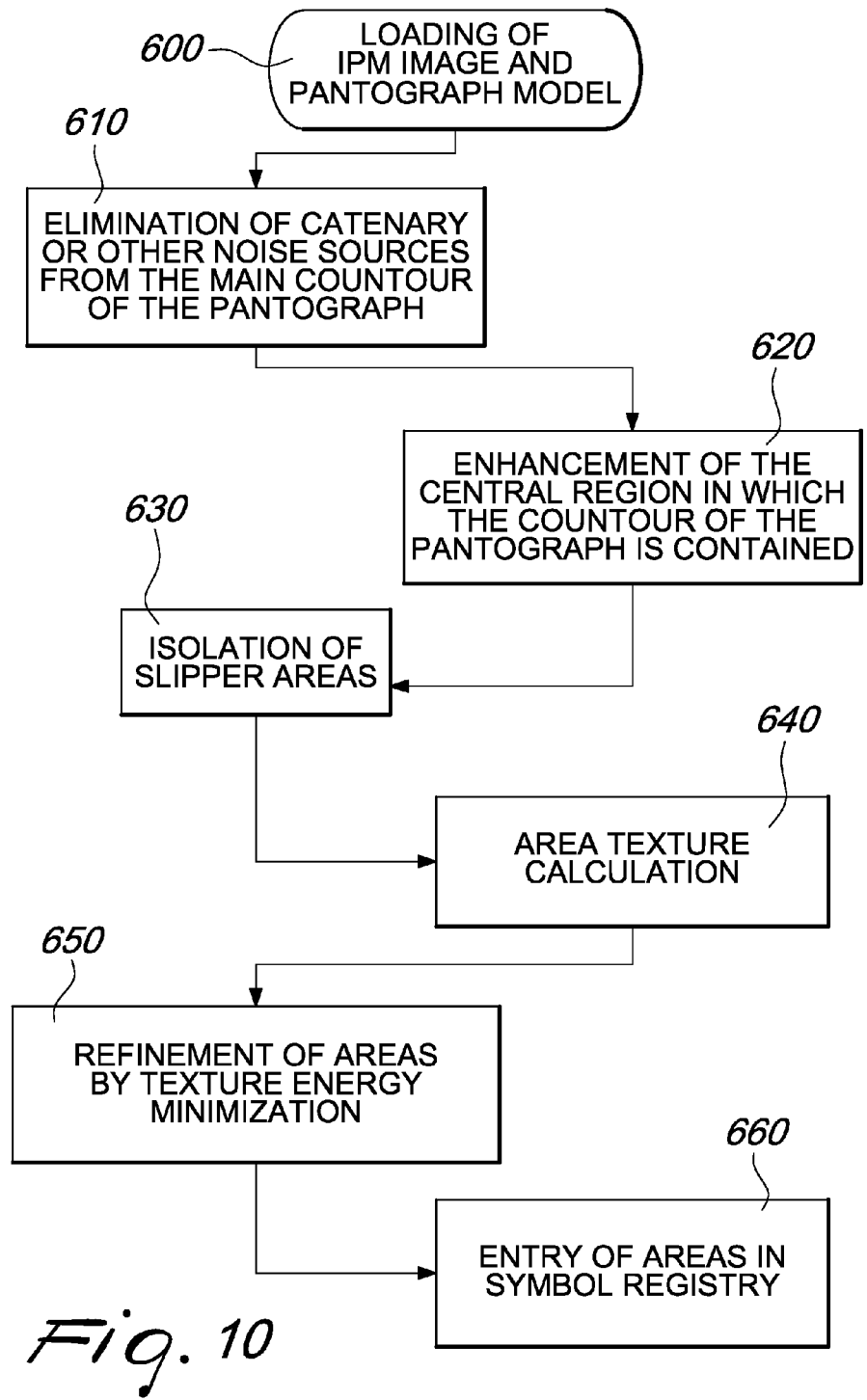
FIG. 10 is a flowchart of a possible embodiment of a method for identifying the slipper area of an image according to the present invention.

With reference to FIG. 10, the method for extrapolating the area related to the gliding elements begins in step 600, in which the diagnostics environment 11 considers the IPM transformation applied in step 230 to the image to be classified and stored in the registry of symbols 15; moreover, the pantograph model produced as symbol in output from the pantograph model classification method described previously with reference to FIG. 9 is loaded from the registry of symbols 15. On the basis of the classification of the pantograph model, the method approximately identifies a macro-area that delimits the contour of the pantograph; then, in step 610, the catenary, which might introduce noise for the subsequent analyses, is eliminated from said area. After an enhancement by histogram stretching of the central region in which the contour of the pantograph is contained in order to increase its contrast, performed in step 620, in step 630 the regions related to the slippers alone of the pantograph are isolated on the basis of the pantograph model that has been classified. The texture of the image of each one of said regions is calculated in step 640; in a preferred embodiment, the texture is calculated by means of a matrix of the Gray Level Co-occurrence Matrix (GLCM) type; then, in step 650, one proceeds with a refinement of the area identified by means of methods that are known in the art and are based on minimizing the energy associated with the calculated textures. In this manner, the regions of the image related to the gliding slippers are isolated and, in step 660, are added to the symbols stored in the symbol registry 15 of the diagnostics environment 11.

Figure 11:
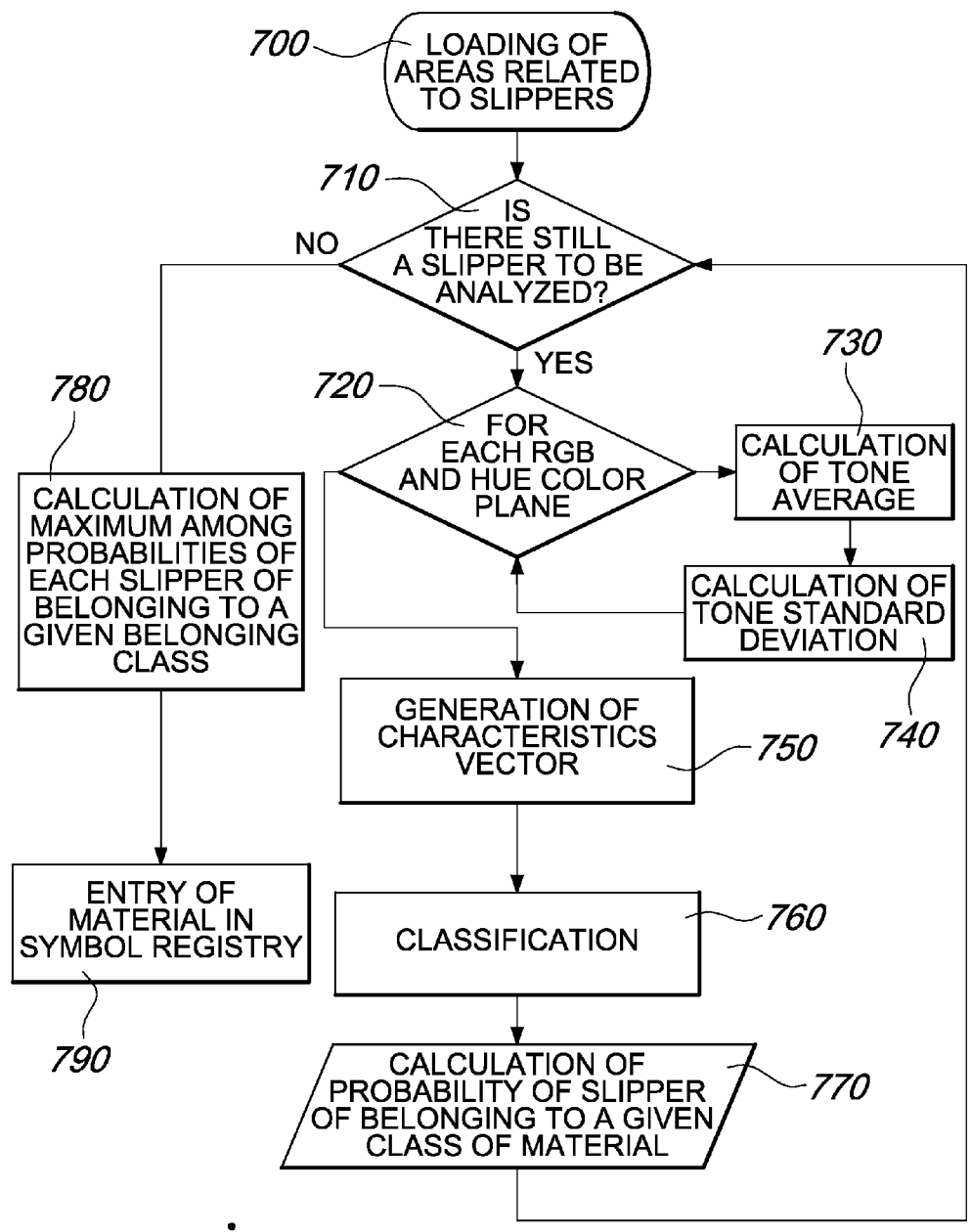
FIG. 11 is a flowchart of a possible embodiment of a method for classification of the type of material of the slippers according to the present invention.
Figure 12:
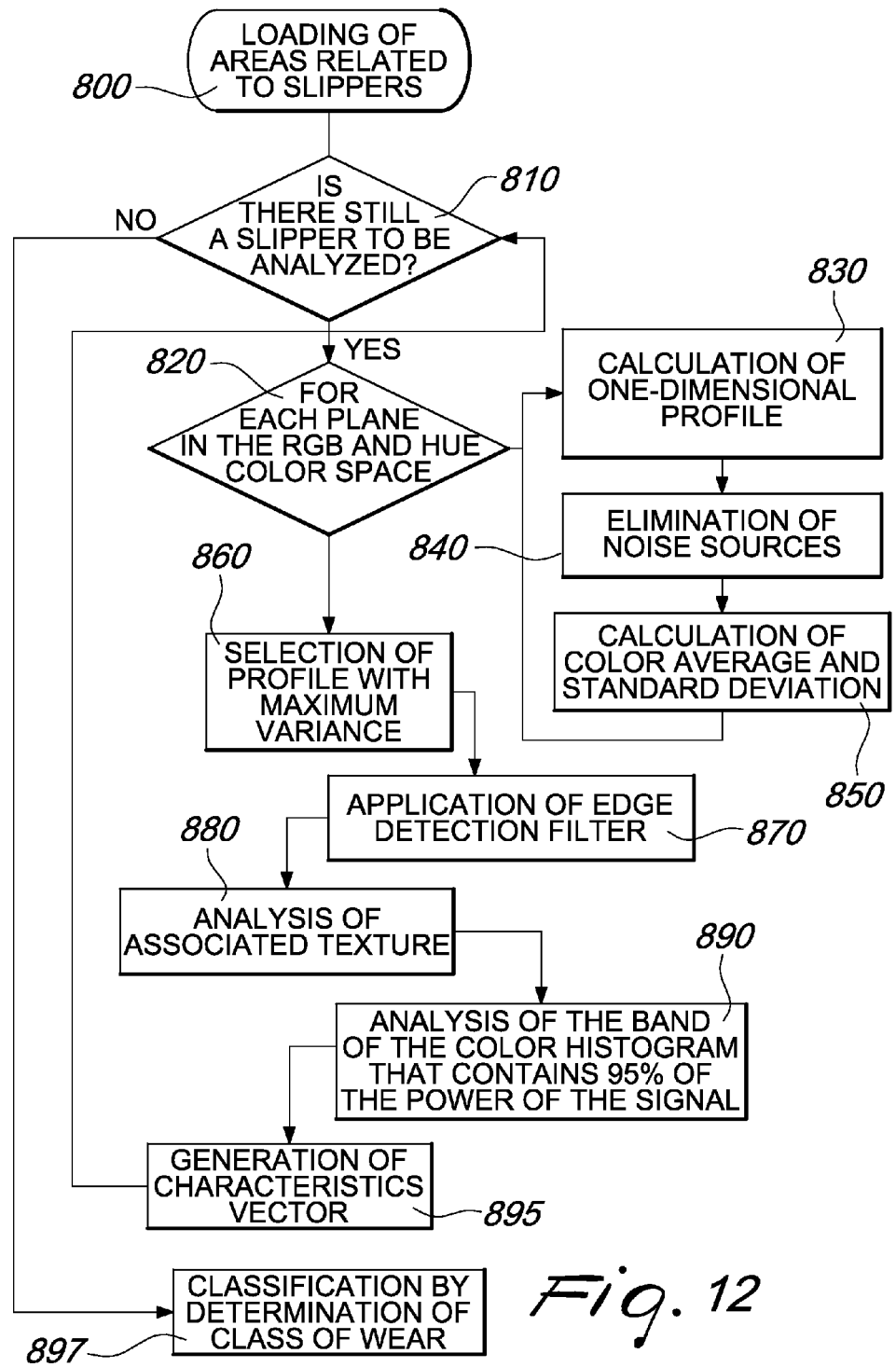
FIG. 12 is a flowchart of a possible embodiment of a method for classification of the degree of wear of the slippers according to the present invention.

Once the areas related to the slippers have been isolated, the diagnostics environment determines the type of material of which the gliding elements are composed by executing the corresponding module. One possible embodiment of the method for classifying the gliding material is illustrated in FIG. 11.

The method begins in step 700, in which the areas related to the slippers extrapolated from the image as a result of the method of FIG. 10 are loaded from the symbol registry 11. Each slipper is considered in step 710 and a vector of characteristics is created for each slipper; in particular, in step 720, for each RGB color plane and HUE color plane of the image, the average of the tone is calculated, in step 730, and the standard deviation of the tone is calculated, in step 740. Once these values have been calculated, in step 750 a vector of characteristics is created which contains the reciprocal differences between the averages of the color planes and the standard deviations of each color plane. In step 760, the vector of characteristics is analyzed by a neural net or by a classification system trained previously, for final classification. In step 770, the probability of belonging of the analyzed slipper to a given class of material is thus stored.

Once all the slippers have been analyzed, in step 780 the maximum value among the probabilities of belonging of each slipper to a given class is calculated, and this maximum value is assumed as a material of which the slippers are constituted; this material, in step 790, is inserted in the registry of symbols 15 of the diagnostics environment 11.

It should be noted that the use of first order features by the classification system renders the analysis method robust and independent of changes in white point calibration of the still camera or of lighting conditions at the acquisition site.

Once the type of material of which the gliding slippers are composed has been established, it is possible to perform a classification of the degree of wear of said slippers. One possible embodiment of the method for classifying the degree of wear of the gliding slippers is now described with reference to FIG. 12.

In step 800, the method loads from the symbol registry 15 the areas of the image in which the slippers of the pantograph have been identified by means of the method described with reference to FIG. 10. In step 810, a sequence of transformations is executed for each one of these areas, i.e., for each gliding element: in particular, in step 820 the RGB and HUE color planes are considered and a one-dimensional profile function is calculated on each color plane from the averages of the rows of pixels of the area of the slipper (step 830); in step 840, potential sources of noise are eliminated from each profile and then in step 850 the average and the standard deviation of the color are calculated; in step 860, the profile that corresponds to the color plane with the highest variance is selected; in step 870, an analysis is performed on the filtered image by adopting an edge detection filter, such as for example a Canny filter or a Sobel filter; in step 880, an analysis of the texture associated with the filtered image is performed; in step 890, an analysis of the band of the color histogram that contains 95% of the power of the signal is performed.

The analyses performed in steps 860 to 890 are used in step 895 to calculate a characteristics vector of the slipper. In a preferred embodiment, this vector comprises the following values:
standard deviation of the profile of the color plane having the highest variance;
maximum dynamics of the profile of the color plane having the highest variance, i.e., the difference between the maximum and minimum values of the profile;
average of the tone of the sub-area with the highest absolute value of the image filtered with the edge detection filter divided into N sub-areas;
dynamics of the color tone within which 95% of the pixels of the area of the slipper of the pantograph are contained;
maximum difference in absolute value between the energy associated with the texture of two contiguous sub-areas of the image of the slipper divided into N sub-areas.

The vector of characteristics is calculated for each slipper by repeating steps 810 to 895; then, in step 897, the state of wear of each slipper is established, submitting the vector of extrapolated characteristics to a discriminating function which, on the basis of the type of material of the slippers, calculated previously with the method illustrated with reference to FIG. 11, determines the probability of belonging to a certain class of wear. In a preferred embodiment, an associated Probability Density Function is used for this purpose, but it is also possible to adopt another classifying system that is known in the art.

In addition to determining the state of wear of the gliding elements of the pantograph, the method according to the invention can be adopted advantageously to determine the degree of perpendicularity of the contour of the pantograph with respect to the direction of motion of the locomotive.

Figure 13:
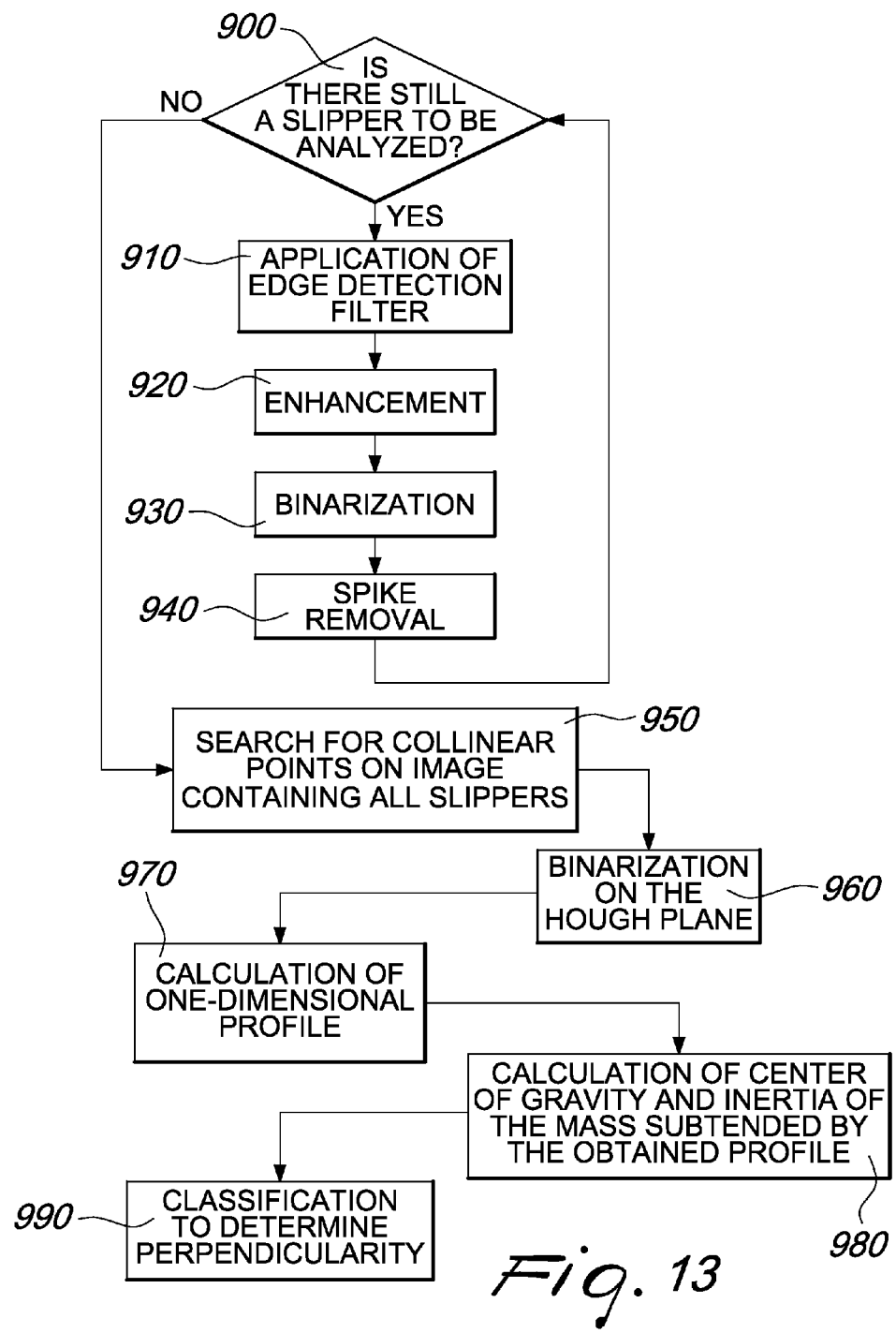
FIG. 13 is a flowchart of a possible embodiment of a method for perpendicularity analysis of the contour of the pantograph with respect to the direction of motion of the locomotive according to the present invention.

A possible embodiment of a method for assessing the degree of perpendicularity is now described with reference to FIG. 13.

The method works on the areas of the image related to the slippers of the pantograph, obtained by means of the method described with reference to FIG. 10; each one of these areas is filtered with an edge detection filter in step 910, in order to determine the edges of the slippers, then is subjected to a histogram stretching step in step 920; in step 930, binarization of the area is then performed and in step 940 any conglomerates that are not consistent in terms of dimensions and/or form factor are removed. Once steps 910 to 940 have been applied to each slipper of the pantograph, in step 950 the binarized areas of the slippers are recomposed into a single image on a black background and a search for the collinear points is performed by using the Hough transform. In step 960, the image produced in step 950 is binarized in the space of the transform, and then in step 970 the method calculates a profile function from the columns of pixels of said image. The center of gravity of the subtended mass and the corresponding inertia of this profile are calculated in step 980; then, in step 990, these values are passed to a classifying system to establish whether the perpendicularity of the pantograph is ensured or not.

The method according to the invention can be adopted advantageously also to analyze any faults or malfunctions, especially caused by sudden impacts or collisions, of the portions at the ends of the pantograph, known as "horns" or "bows" depending on the type of pantograph. This method requires a preliminary step of end calibration, to be performed only once during the installation of the system, which is very similar to the calibration method described with reference to FIG. 8. At the end of this step, a parametric model is extrapolated for each pantograph model and stored in the system and is based on the distances and thicknesses of the contour of the pantograph.

Figure 14:
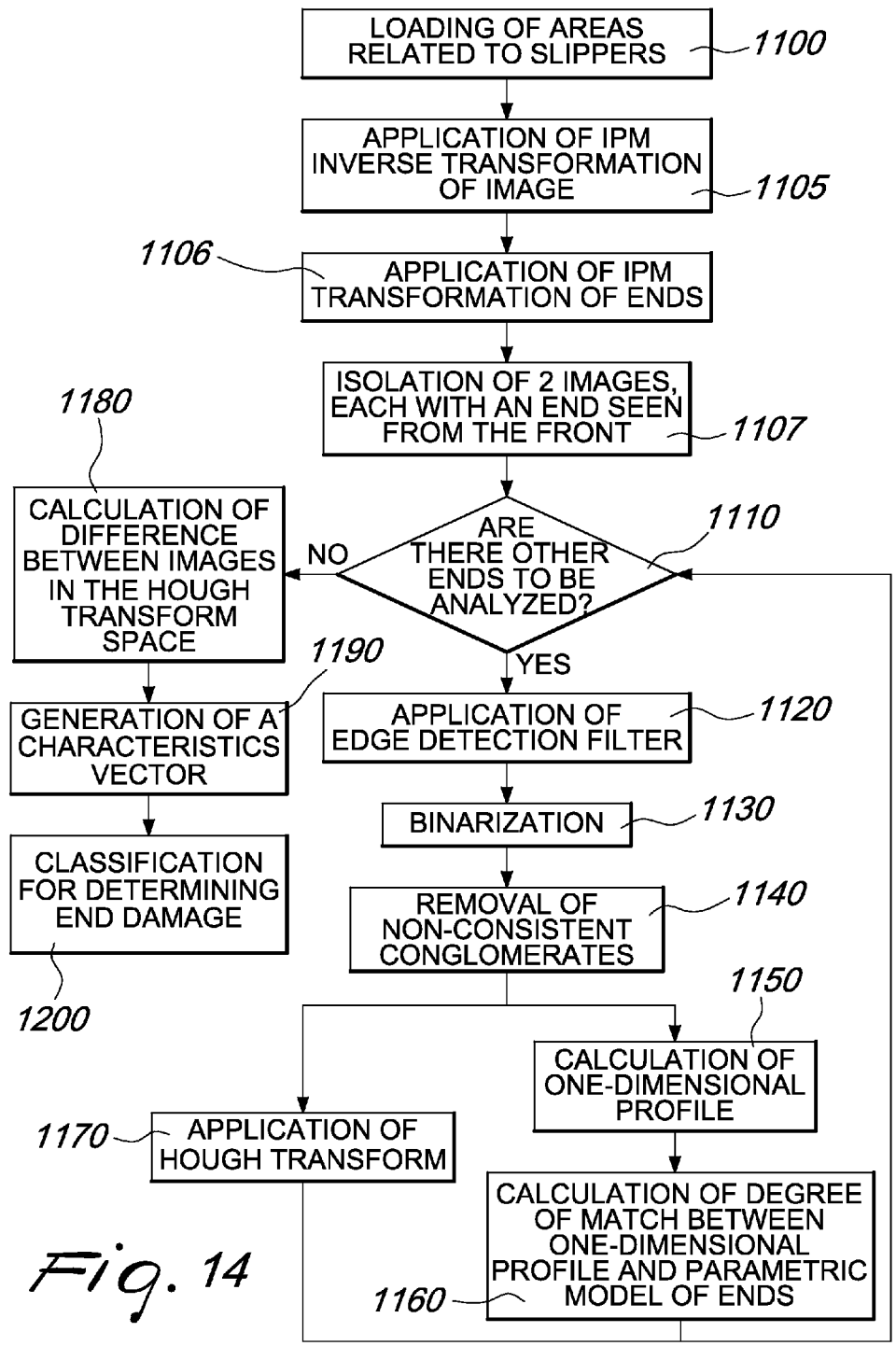
FIG. 14 is a flowchart of a possible embodiment of a method for the analysis of the end parts of a pantograph according to the present invention.

A possible embodiment of a method for analyzing the end parts of the pantograph is now described with reference to FIG. 14.

The method begins in step 1100, which considers the images of the two macro-areas in the IPM image at the gliding bars of the pantograph extrapolated by the classifying method described in FIG. 10 in step 630.

In step 1105, the inverse of the IPM transformation matrix calculated in step 420 of the calibration method described in FIG. 8 is applied to each one of these areas so as to generate an image in which the gliding bars are in the original perspective; then in step 1106 the method applies to the image generated in step 1105 the IPM transformation matrix for the ends calculated during end calibration, so as to generate an image in which the end region appears as if seen from a front position; the IPM transformation matrix for the ends is applied also to the points that identify the position of the gliding bars in the original image, thus obtaining the position of the gliding bars in the new image produced by applying said IPM matrix. Knowing the position of the gliding bars, and knowing that the "horns" or "bows" represent their ends, in step 1107 the method isolates in the image generated in step 1106 two portions, each one containing an end, taken in a front position. In step 1110, the method analyzes separately each one of the ends. In particular, in step 1120 an edge detection filter, for example a Canny filter or a Sobel filter, is applied to each one of the two portions, then in step 1130 a binarization is applied with Otsu's method, and in step 1140 a removal of the conglomerates that are not consistent in terms of dimensions and/or form factor is applied. At this point, in step 1150 a one-dimensional profile is extrapolated from each portion, obtained by averaging on the "columns" of pixels of the image, which highlights peaks at the vertical edges of the end; the degree of match of said profile with the model of the end obtained for the same type of pantograph during end calibration is measured in step 1160.

Simultaneously, in step 1170, the Hough transform is applied to each filtered and binarized image, thus obtaining two images in the space of the transform.

In view of the geometry of the two ends, they are intact if they are symmetrical and mirrored with respect to a hypothetical axis that passes through the point where their center of gravity is located; therefore, in step 1180 the method acts by subtracting the images in the plane of the transform; if the difference is great, this indicates the fact that there is low symmetry; if the difference is small, the two ends are symmetrical and mirrored.

In step 1190, values obtained from the degree of match between the model and the profile of each end and the value obtained from the difference of the two images in the Hough transform domain populate a vector of characteristics; in step 1200, this vector is processed by a classifying system that establishes whether the ends are damaged or not.

In practice it has been found that the system and the method according to the invention fully achieve the intended aim and objects.

In particular it has been seen that the method and system thus conceived allow to overcome the qualitative limitations of the background art, since the completeness of the analysis performed on the images ensures higher accuracy of the results obtained.

Moreover, the system according to the invention is conceived so as to allow diagnostics of the pantographs even in uncontrolled environments, i.e. environments that are not specifically designed to the aim of the present invention: it is in fact possible to capture the images during transit in operation up to a speed of 300 km/h.

Moreover, complex hardware artifacts on the acquisition site are not required for setup, calibration or operation of the image acquisition apparatus, with evident advantages in terms of ease of production and costs.

The system and the method thus conceived are susceptible of numerous modifications and variations, all of which are within the scope of the appended claims.

It is further evident that the inventive concept on which the present invention is based is independent of the actual implementation of the software modules, which can be provided in any language and on any hardware platform.

Therefore, the protective scope of the claims must not be limited by the illustrations or by the preferred embodiments given in the description by way of example, but rather the claims must comprise all the characteristics of patentable novelty that reside within the present invention, including all the characteristics that would be treated as equivalent by the person skilled in the art.

The disclosures in Italian Patent Application No. MI2010A001721 from which this application claims priority are incorporated herein by reference.

The invention claimed is:

1. A method for automatic diagnostics of images related to pantographs, comprising the steps of:
   a) capturing, using an image capture apparatus located in one of a plurality of image acquisition sites, an image that shows a pantograph of a locomotive, said image being taken from an aerial view during the travel of said locomotive, said image comprising a gliding area of a plurality of slippers of said pantograph;
   b) identifying, using a module for classifying the pantograph model, a model of said pantograph within a plurality of pantograph models, based on said image captured in step a);
   c) determining, using a module for classifying materials, a material of which said slippers are composed among a plurality of materials, based on said pantograph model identified in step b);
   d) determining, using a module for classifying degree of wear, a value related to state of wear for each one of said plurality of said slippers, based on said type of material determined in step c); and
   e) determining, using a module for analyzing end portions, whether the end portions of said pantograph are damaged, based on a plurality of portions of said image extracted from said image, each portion containing the image of said gliding area of one of said slippers;
   wherein the step e) comprises the steps of:
   mm) applying an inverse of a first inverse perspective mapping (IPM) transformation matrix to an image that comprises said plurality of portions of said image, to generate a first image in which said gliding areas are shown in the original perspective;
   nn) applying to said first image calculated in step mm) a second IPM transformation matrix, to generate a second image in which the ends of said gliding areas are displayed in a front perspective;
   oo) isolating a plurality of portions of said second image, each comprising an end seen in a front position;
   pp) applying an edge detection filter to each one of said plurality of portions isolated in step oo);
   qq) binarizing with Otsu's method each one of said plurality of portions filtered in step pp);
   rr) removing, from each one of said plurality of portions binarized in step qq), conglomerates that are not consistent in terms of dimensions and/or form factor;
   ss) calculating, for each one of said plurality of portions calculated in step rr), a one-dimensional profile based on the columns of the pixels of said portion;
   tt) measuring, for each one of said one-dimensional profiles calculated in step ss), a degree of match with each one of a plurality of end models stored in the system;
   uu) applying a Hough transform to each one of said plurality of portions calculated in step rr);
   vv) calculating a difference between the images generated in step uu) in the space of said Hough transform;
   ww) generating a characteristics vector, said vector comprising the values generated in steps tt) and vv); and
   xx) applying a classifying system to said characteristics vector generated in step ww), to establish a degree of damage of said ends.

2. The method according to claim 1, further comprising the step of:
   determining, using a module for assessing degree of perpendicularity, a degree of perpendicularity of the contour of said pantograph with respect to the direction of motion of said locomotive, based on a plurality of portions of said image extracted from said image, each portion containing the image of said gliding area of one of said slippers.

3. The method according to claim 2, wherein said step of determining the degree of perpendicularity comprises the steps of:
   cc) applying an edge detection filter to each portion of said plurality of portions of said image, said filter being adapted to determine the edges of said slippers;

dd) subjecting each portion of said plurality of portions of said image obtained from step cc) to a histogram stretching operation;

ee) subjecting each portion of said plurality of portions of said image obtained from step dd) to a binarization operation;

ff) subjecting each portion of said plurality of portions of said image obtained from step ee) to an operation for removing conglomerates that are not consistent in terms of dimensions and form factor;

gg) recomposing said plurality of portions of said image into an image and generating a transformed image, by means of the Hough transform, said transformed image being adapted to identify co-linear points;

hh) binarizing said transformed image in the space of said transform;

ii) calculating a one-dimensional profile based on the columns of pixels of said transformed image;

jj) calculating values related to the center of gravity and inertia of the mass subtended by said one-dimensional profile;

kk) determining, using a module for classifying the degree of perpendicularity, a value related to the perpendicularity of the contour of said pantograph with respect to the direction of motion of said locomotive, based on said values determined in step jj).

4. The method according to claim 1, wherein said step c) comprises the steps of:

m) calculating, for each portion of said plurality of portions of said image, a first value related to the average of the tone for the RGB color plane, a second value related to the standard deviation of the tone for the RGB color plane, a third value related to the average of the tone for the HUE color plane, and a fourth value related to the standard deviation of the tone for the HUE color plane;

n) generating, for each portion of said plurality of portions of said image, based on said first, said second, said third and said fourth values, a vector that comprises the mutual difference between the average and the standard deviation of the RGB color plane and the reciprocal difference between the average and the standard deviation of the HUE color plane;

o) calculating, for each portion of said plurality of portions of said image and for each material of said plurality of materials, a value related to the probability of said portion of belonging to said material, based on said vector generated in step n);

p) determining a material of said plurality of materials based on said values related to said belonging probabilities determined in step o).

5. The method according to claim 1, wherein said step d) comprises the steps of:

r) calculating, for each portion of said plurality of portions of said image, a first one-dimensional profile whose values correspond to the average of the rows of pixels of said portion for the RGB color plane;

s) calculating, for each portion of said plurality of portions of said image, a second one-dimensional profile whose values correspond to the average of the rows of pixels of said portion for the HUE color plane;

t) eliminating, for each portion of said plurality of portions of said image, sources of noise from said first one-dimensional profile and from said second one-dimensional profile;

u) calculating, for each portion of said plurality of portions of said image, the average and the standard deviation of the color of said first one-dimensional profile and of said second one-dimensional profile;

v) selecting, for each portion of said plurality of portions of said image, the one-dimensional profile between said first one-dimensional profile and said second one-dimensional profile that corresponds to the color plane with the highest variance;

w) applying an edge detection filter to said plurality of portions of said image;

x) analyzing the texture associated with said plurality of portions of said image filtered in step w);

y) analyzing the band of the color histogram of said plurality of portions of said image containing 95% of the power of the signal;

z) generating, for each portion of said plurality of portions of said image, a characteristics vector, which comprises the values calculated in steps v), w), x) and y);

aa) determining, for each portion of said plurality of portions of said image, the probability of belonging to a given class of wear based on said characteristics vector.

6. A method for automatic diagnostics of images related to pantographs, comprising the steps of:

a) capturing, using an image capture apparatus located in one of a plurality of image acquisition sites, an image that shows a pantograph of a locomotive, said image being taken from an aerial view during the travel of said locomotive, said image comprising the gliding area of a plurality of slippers of said pantograph;

b) identifying, using a module for classifying the pantograph model, a model of said pantograph within a plurality of pantograph models, based on said image captured in step a);

c) determining, using a module for classifying materials, a material of which said slippers are composed among a plurality of materials, based on said pantograph model identified in step b);

d) determining, using a module for classifying degree of wear, a value related to state of wear for each one of said plurality of said slippers, based on said type of material determined in step c);

wherein the method further comprises, prior to said step for capturing said image, and for each site of said plurality of image acquisition sites, the steps of:

i) loading, from storage means, a sample image, said sample image originating from one of said plurality of image acquisition sites;

ii) selecting from said sample image four coplanar points, said four coplanar points being adapted to define a plane on which said plurality of slippers of said pantograph lies;

iii) calculating a first inverse perspective mapping (IPM) transformation matrix on said sample image, based on said four points selected in step ii);

iv) applying, to each pantograph model of a plurality of pantograph models stored in storage means, said first IPM transformation matrix;

v) extrapolating, using an edge detection filter, the vertical edges of each image calculated in step iv);

vi) calculating a one-dimensional profile of each image based on said vertical edges extrapolated in step v);

vii) extrapolating, from each one-dimensional profile calculated in step vi), a parametric model of said pantograph model of said plurality of pantograph models;

viii) storing said parametric models extrapolated in step vii) in storage means (10), said parametric models being associated with said acquisition site;

ix) selecting from said sample image four coplanar points, said four coplanar points being adapted to define a plane on which the ends of said plurality of sliders of said pantograph lie;
x) calculating a second IPM transformation matrix on said sample image, based on said four points selected in step ix);
xi) repeating steps iv) to viii), adopting said second IPM transformation matrix,
wherein the method further comprises prior to step b), the step that consists of applying said first IPM transformation matrix to said image that shows said pantograph; and
wherein said step (b) comprises the steps of:
f) classifying, using a memory prediction framework (MPF) based method and of a classifying system whose classes represent a plurality of pantograph models, said IPM image with respect to said plurality of said pantograph models, said classification being adapted to generate, for each model of said plurality of said pantograph models, a first value associated with said pantograph model;
g) extrapolating using an edge detection filter, the vertical edges of said IPM image;
h) calculating a one-dimensional profile of said IPM image based on said vertical edges extrapolated in step g);
i) calculating, for each model of said plurality of said pantograph models, a second value related to an index of correlation between said model and said one-dimensional profile generated in step h);
j) calculating, for each model of said plurality of said pantograph models, a third value associated with said pantograph model, said third value being based on said first value and on said second value; and k) calculating the maximum value of said third values calculated in step j).

* * * * *